(12) United States Patent
Irnleitner (10) Patent No.: US 8,888,278 B2
(45) Date of Patent: Nov. 18, 2014

(54) APPARATUS FOR EYESIGHT ENHANCEMENT, METHOD FOR CALIBRATING AN APPARATUS AND COMPUTER PROGRAM

(71) Applicant: Sony DADC Austria AG, Anif (AT)

(72) Inventor: Norbert Irnleitner, Bergheim (AT)

(73) Assignee: Sony DADC Austria AG, Anif (AT)

( * ) Notice: Subject to any disclaimer, the term of this patent is extended or adjusted under 35 U.S.C. 154(b) by 0 days.

(21) Appl. No.: 14/055,384

(22) Filed: Oct. 16, 2013

(65) Prior Publication Data

US 2014/0226126 A1 Aug. 14, 2014

(30) Foreign Application Priority Data

Feb. 8, 2013 (EP) ..................................... 13000675

(51) Int. Cl.
*G02C 7/06* (2006.01)
*G02C 7/08* (2006.01)
(52) U.S. Cl.
CPC *G02C 7/081* (2013.01); *G02C 7/06* (2013.01); *G02C 7/085* (2013.01)
USPC .............. 351/159.52; 351/159.39; 351/159.4; 351/159.41; 351/159.42
(58) Field of Classification Search
CPC .......... G02C 7/08; G02C 7/081; G02C 7/083; G02C 7/085; G02C 7/086; G02C 7/088
USPC ............. 351/159.39, 159.52, 159.77, 159.78, 351/159.79
See application file for complete search history.

(56) References Cited

U.S. PATENT DOCUMENTS

| | | | | |
|---|---|---|---|---|
| 5,182,585 | A * | 1/1993 | Stoner | 351/41 |
| 5,861,936 | A * | 1/1999 | Sorensen | 351/200 |
| 8,002,403 | B2 * | 8/2011 | Silver et al. | 351/110 |
| 8,087,778 | B2 | 1/2012 | Gupta et al. | |
| 2006/0224238 | A1 * | 10/2006 | Azar | 623/6.22 |
| 2010/0103373 | A1 * | 4/2010 | Hillis et al. | 351/205 |
| 2012/0008094 | A1 * | 1/2012 | Blum et al. | 351/216 |
| 2012/0019557 | A1 | 1/2012 | Aronsson et al. | |
| 2012/0087014 | A1 * | 4/2012 | Nibauer et al. | 359/665 |
| 2012/0127062 | A1 | 5/2012 | Bar-Zeev et al. | |

OTHER PUBLICATIONS

M. G. Douali, et al., "Self-optimised vision correction with adaptive spectacle lenses in developing countries", Ophthal. Physiol. Opt. 24, The College of Optometrists, 2004, 8 pages.

* cited by examiner

*Primary Examiner* — Scott J Sugarman
*Assistant Examiner* — William Alexander
(74) *Attorney, Agent, or Firm* — Oblon, Spivak, McClelland, Maier & Neustadt, L.L.P.

(57) ABSTRACT

An apparatus for eye sight enhancement includes a lens having a first mode with a first optical power and a second mode with a second optical power, an actuator device adapted to vary a mode of the lens from the first mode to the second mode and from the second mode to the first mode, a fixing device adapted to fix the lens in a mounting position, a sensor device adapted to determine a focusing distance, and a processor adapted to control an operation of the actuator device depending on the focusing distance.

17 Claims, 6 Drawing Sheets

APPARATUS FOR EYESIGHT ENHANCEMENT, METHOD FOR CALIBRATING AN APPARATUS AND COMPUTER PROGRAM

BACKGROUND

The present disclosure relates to an apparatus for eyesight enhancement, e.g. of an eye-glass type. Further, the present disclosure relates to a method for calibrating an apparatus for eyesight enhancement.

DESCRIPTION OF RELATED ART

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Commonly known spectacles support a user by correcting his visual impairments. However, the support is rather static, apart from a known adaption to changing light conditions e.g. in sunglasses.

Thus, there is a need for further enhancing a user's eye sight in accordance with changing needs and conditions.

SUMMARY

An apparatus for eye sight enhancement, includes a lens having a first mode with a first optical power, and a second mode with a second optical power, an actuator device adapted to vary a mode of the lens from the first mode to the second mode and from the second mode to the first mode, a fixing device adapted to fix the lens in a mounting position, a sensor device adapted to determine a focusing distance, and a processor adapted to control an operation of the actuator device depending on the focusing distance.

In a method for calibrating an apparatus for eye sight enhancement, the apparatus includes a lens having a first mode with a first optical power, and a second mode with a second optical power, an actuator device adapted to vary the mode of the lens from the first mode to the second mode and from the second mode to the first mode, a fixing device adapted to fix the lens in a mounting position, a sensor device adapted to determine a focusing distance, a processor adapted to control an operation of the actuator device depending on the focusing distance, and an input device adapted to input information and to provide the information to the processor. The method includes displaying an image on a display; during the displaying, controlling the actuator device to vary an optical power of the lens; evaluating information provided by the input device; determining a correction offset depending on the deformation and on the information; and controlling an operation of the actuator device depending on the correction offset.

The foregoing paragraphs have been provided by way of general introduction, and are not intended to limit the scope of the following claims. The described embodiments, together with further advantages, will be best understood by reference to the following detailed description taken in conjunction with the accompanying drawings. The elements of the drawings are not necessarily to scale relative to each other.

BRIEF DESCRIPTION OF THE DRAWINGS

A more complete appreciation of the disclosure and many of the intended advantages thereof will be readily obtained as the same becomes better understood by reference to the following detailed description when considered in connection with the accompanying drawings, wherein.

DESCRIPTION OF THE EMBODIMENTS

Figure 1:
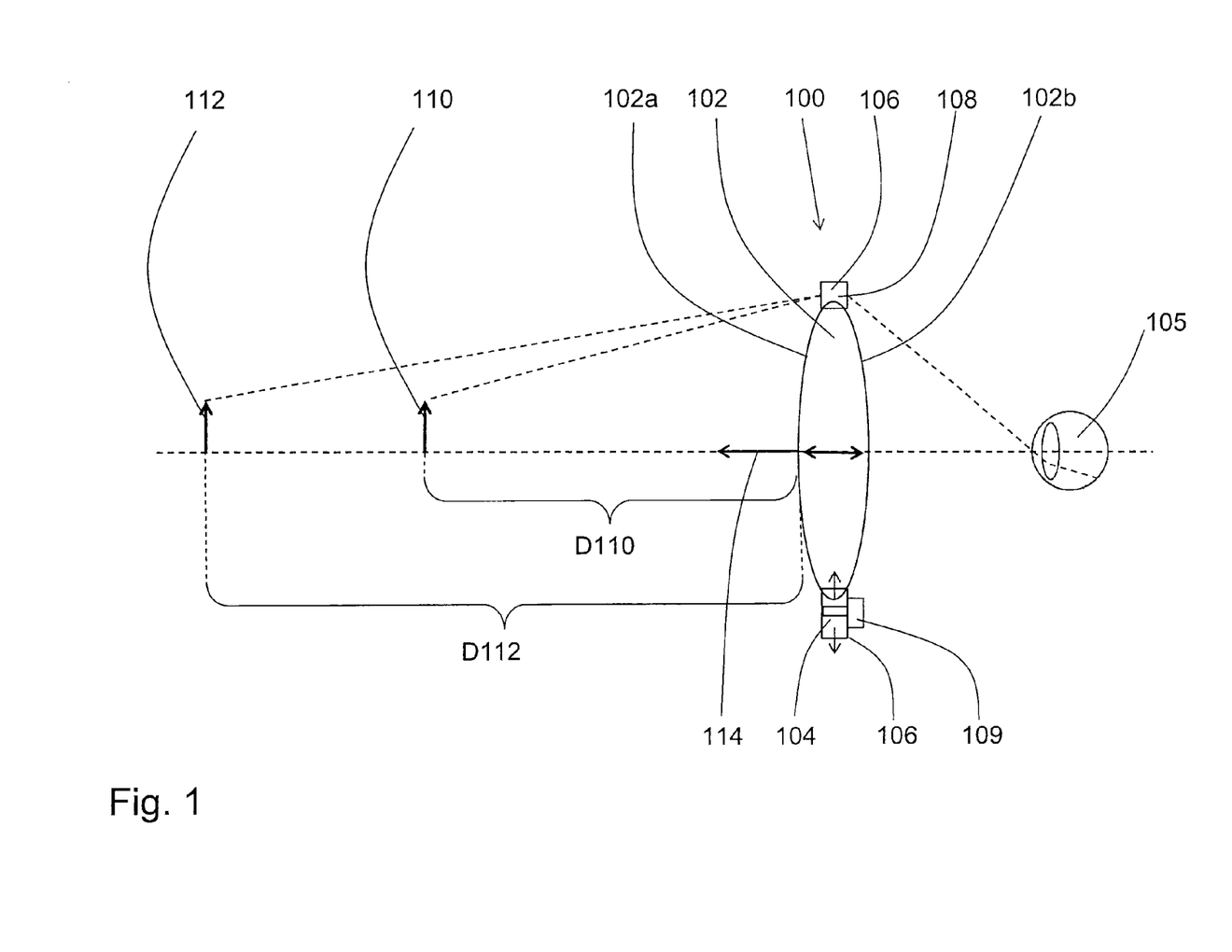
FIG. 1 illustrates an embodiment of an apparatus for eye sight enhancement.

Referring now to the drawings, wherein like reference numerals designate identical or corresponding parts throughout the several views, FIG. 1 illustrates an embodiment of an apparatus 100 for eye sight enhancement.

The apparatus for eye sight enhancement includes a lens having a first mode with a first optical power, and a second mode with a second optical power. In the embodiment depicted, the apparatus includes a flexible lens 102 having a first surface 102a and a second surface 102b opposite to the first surface 102a, wherein at least one of the surfaces 102a, 102b is adapted to be shaped in a first mode with a first curvature and in a second mode with the second curvature. In the first mode, the first curvature yields a first optical power of lens 102, and in the second mode, the second curvature yields the second optical power of lens 102.

However, lens 102 may be any kind of adjustable-focus lens, allowing dynamically changing the focal length and/or the optical power of lens 102. For example, the optical power may be adjusted by dynamically changing a refraction index of the material of lens 102, e.g. by changing an electric current applied to liquid crystals of lens 102.

Of course, there may be any number of modes, in which the at least one of the surfaces 102a, 102b may be shaped with a respective curvature. In particular, the curvature of the surface 102a, 102b and thus the optical power of lens 102 may be varied continuously.

Further, apparatus 100 includes an actuator device adapted to vary a mode of the lens from the first mode to the second mode and from the second mode to the first mode. In particular, as illustrated for the embodiment including the flexible lens, the actuator device 104 may be adapted to deform lens 102 from the first mode to the second mode and from the second mode to the first mode. For example, the actuator may be a piezoelectric, micro- and/or nano-mechanical actuator adapted to apply a force to flexible lens 102, thereby deforming it e.g. from the first mode to the second mode and vice versa. Actuator device 104 may be any device adapted to modify the optical power of the lens, e.g. the curvature of the at least one surface.

Further, apparatus 100 may include a fixing device 106 adapted to fix the lens in a mounting position. The mounting position may be a mounting position of the apparatus for eyesight enhancement during usage by a user. For example, lens 102 may be fixed in the mounting position in front of a user's eye 105, i.e. within a field of vision of the user. For fixing lens 102 in the mounting position, fixing device 106 may for example include an e.g. essentially ring-shaped frame surrounding and holding flexible lens 102. The frame may further be of any shape, e.g. U-shaped or may be adapted to fix flexible lens 102 at one or a plurality of distinct fixing points in the mounting position. Alternatively or in addition, fixing device 106 may also include attachment members adapted to fix and/or hold apparatus 100 in the mounting position, e.g. eyeglass hanger members for attaching apparatus 100 in contact e.g. with the user's ears.

Further, apparatus 100 may include a sensor device 108 adapted to determine a focusing distance. For example, sensor device 108 may be a distance sensor adapted to determine a distance to an object e.g. within a field of vision through flexible lens 102, i.e. an object located in a field of a vision of the user having apparatus 100 mounted in the mounting position.

Apparatus 100 may further include a processor 109 adapted to control an operation of actuator device 104 depending on the focusing distance. For example, processor 109 may be adapted to cause actuator device 104 to deform flexible lens 102 from the first mode (e.g. a near sight mode) to the second mode (e.g. a far sight mode) and vice-versa, depending on the focusing distance.

Thus, apparatus 100 may support the user's eyesight dynamically in accordance with changing needs and conditions, e.g. depending on a distance to object to which apparatus 100 is directed to and/or the user is focusing to. This is achieved by modifying an optical power of flexible lens 102 by means of actuator device 104. Since sensor device 108 may determine the focusing distance and processor 109 may control the operation of the actuator device 104 depending on the focusing distance, the user's eye sight may be enhanced dynamically and without any user interaction according to the changing viewing conditions (e.g. far sight/near sight). Thus, the user may be supported in his everyday life and/or in accomplishing specific tasks requiring a dynamic viewing enhancement.

In a further embodiment, the focusing distance may correspond to a distance of an object with respect to apparatus 100. For example, sensor device 108 may determine a first distance D110 to a near object 110 e.g. within the field of vision supported by apparatus 100. Processor 109 may accordingly control the operation of actuator device 104 according to the first distance D110, causing a deformation of lens 102 to the first mode, i.e. near-sight mode with the first curvature yielding the first optical power of the lens. The first optical power may be adapted to optimally support the user in focusing near object 110.

In another situation, sensor device 108 may determine a second distance D112 to a far object 112 and provide the second distance D112 to processor 109. Processor 109 may control the operation of actuator device 104 accordingly. Thus, actuator device 104 is caused to deform flexible lens 112 according to the second mode, e.g. far-sight mode, with the second curvature, yielding a second optical power of lens 102. The second optical power may be adapted to optimally support the eye sight of the user in focusing far object 112. Thus, apparatus 100 may dynamically support the user's visual abilities according to changing needs, e.g. different scenes in the field of vision of the user.

In an embodiment, sensor device 108 may determine the first and/or second distances D110, D112 in a direction essentially orthogonal to the surface of lens 102, e.g. in a center of lens 102, as illustrated by arrow 114.

For example, the direction in which the first and second distances D110, D112 are measured may depend on an orientation of apparatus 100. For example, the direction may always correspond to a predetermined direction of arrow 114 with respect to apparatus 100, e.g. to a direction essentially orthogonal to first surface 102a, e.g. at an optical or physical center of lens 102. Thus, the viewing direction may correspond to a viewing direction of apparatus 100 when used by the user. This represents a simple working principle, guaranteeing that the first and second distances D110, D112 are measured essentially in the field of vision of the user.

In a further embodiment, sensor device 108 may include a first sensor and a second sensor, the first sensor being adapted to determine a viewing direction, the second sensor being adapted to determine the focusing distance depending on the viewing direction.

The first sensor may determine the viewing direction by using e.g. a camera for determining e.g. an orientation of the user's eye 105 and/or on an aperture of the user's eye 105. The orientation and/or aperture may be determined by processing an image captured by the camera. Thus, the viewing direction may be dynamically adapted to an effective viewing direction of the user wearing apparatus 100. However, since the viewing direction may also be determined depending on an orientation of apparatus 100, the first sensor device is optional.

The sensor device and/or the second sensor may determine the focusing distance depending on the viewing direction. For example, the focusing distance may be determined as a distance of an object with respect to apparatus 100, which object is located in the viewing direction as determined by the first sensor. For example, the focusing distance may be determined as the distance of a nearest object located in the viewing direction.

Further, in an embodiment, if the focusing distance is determined to be near, e.g. nearer than a predetermined threshold, and the nearest object is determined to be small, i.e. smaller than a predetermined threshold, the actuator device may adapt the mode (e.g. the optical power and/or curvature) of the lens according to a third mode (spyglass mode), in which small objects in a near field vision environment may be magnified.

The sensor device and/or the second sensor may be adapted to determine the focusing distance in various ways. For example, the distance may be determined using ultrasonic sound waves and/or infrared light. In the first case, ultrasonic sound waves may be emitted from the sensor, and a (shortest) delay of their refraction may be measured. Depending on the delay, the distance to an object in the viewing direction is calculated. In the case of infrared light measurement, infrared light may be used to triangulate the distance to the object. Further alternatively or in addition, passive measurement techniques may be used, determining the focusing distance by performing a passive analysis of an image entering an optical system of apparatus 100, e.g. using phase detection and/or contrast measurement. In this case, no energy needs to be directed towards an object in the viewing direction. Thus, the sensor device and/or the second sensor may basically correspond to sensors as used in cameras for realizing autofocusing features. These kinds of sensors may be further miniaturized.

In a further embodiment, the processor may be adapted to control an operation of actuator device 104 depending on a predetermined correction offset. For example, the first and second mode and/or first and second curvature of flexible lens 102 may be modified through actuator device 104 on the one hand according to measurement results of sensor device 108 (e.g. the first and/or second sensor) and on the other hand according to the correction offset. In particular, the first and second mode and/or the first and second curvature of flexible lens 102 may be modified through actuator device 104 according to measurement results of sensor device 108 (e.g. the first and/or second sensor), while additionally taking into account the correction offset. The correction offset may have been determined e.g. in a calibration step, as will be described in more detail below.

The correction offset may be adapted to correct a visual impairment. The visual impairment may be a visual impairment of the user, resulting e.g. from myopia, hyperopia, presbyopia and/or astigmatism of at least one of the user's eyes 105. Thus, the user's eye sight may be enhanced depending on his personal visual abilities and visual impairments, allowing a correction of arbitrary ametropia while dynamically supporting the user in focusing at objects located in various distances.

Further, the correction offset may depend on the focusing distance. For example, a presbyopia may result in different correction offsets, e.g. a first correction offset for near vision (focusing distance below a predetermined near-sight threshold), a second correction offset for normal vision (focusing distance between the predetermined near-sight threshold and a predetermined far-sight threshold), and a third correction offset for far vision (focusing distance above a predetermined far-sight threshold).

In a further embodiment, lens 102 may include a transparent, elastic material and/or a polysiloxane.

The polysiloxane may be a polymerized siloxane with e.g. organic side chains, such as a silicone. This kind of material may on the one hand be transparent and on the other hand elastic. Representative examples of polysiloxane are [SiO(CH$_3$)$_2$]$_n$ (polydimethylsiloxane) and [SiO(C$_6$H$_5$)$_2$]$_n$ (polydiphenylsiloxane). These compounds may include organic side chains conferring hydrophobic properties. Also halogens, mainly chlorine, may be used as side compound.

When using an elastic material, the optical power may be adjusted by adjusting a curvature of at least one of the surfaces 102*a*, 102*b* of lens 102. For example, a force may be applied to the elastic material of flexible lens 102, thereby deforming the first and/or second surfaces 102*a*, 102*b*.

In particular, in the first mode, actuator device 104 may apply a first force to the elastic material. In the second mode, actuator device 104 may apply a second force to the elastic material. The first force and the second force may be applied e.g. from an outer circumference of lens 102 towards a physical (and/or optical) center of lens 102, e.g. by actuator device 104 located at the outer circumference of lens 102, e.g. within the frame.

Application of the first and second force may cause the at least one of the surfaces 102*a*, 102*b* of flexible lens 102 to form the first or second curvature, respectively. Thus, depending on the force, lens 102 exhibits the first or second optical power.

In particular, a plurality of actuators may be provided and arranged at the circumference of lens 102. By controlling these actuators, any shape of lens 102 may be formed.

For applying the first and/or second force, any kind of actuator, e.g. a piezoelectric, micro- and/or nano-mechanical actuator, may be used. A piezoelectric actuator may for example include a piezoelectric material to which varying electric fields may be applied, a field strength being controlled e.g. by the processor depending on the focusing distance and/or on the correction offset. Since variations of the field strength result in small changes of a width of the piezoelectric material, the force applied by the piezoelectric actuator can be changed with high precision. Thus, using the piezoelectric actuator can be very effective for applying the force with high accuracy, thus accurately influencing the optical power of flexible lens 102 for high precision visual support.

Further alternatively or in addition, the lens may include a cavity covered on a side facing the first surface 102*a* by a first cover and on a side facing the second surface 102*b* by a second cover, at least one of the first cover and the second cover including a flexible membrane. The cavity may be filled with a liquid having essentially the same refraction index as a material of the first cover, of the second cover and/or of lens 102. In the first mode, actuator device 104 may fill the cavity with a first quantity of liquid, and in the second mode, actuator device 104 may fill the cavity with a second quantity of liquid.

For example, the first cover may be a generally rigid transparent front cover of flexible lens 102, while the second cover may include the flexible membrane. Thus, the cavity is formed between the rigid front cover and the flexible membrane forming the second cover.

The cavity may be filled with a varying amount of the liquid. For example, actuator device 104 may include a pump adapted to pump the liquid from a reservoir into the cavity, or to draw the liquid from the cavity e.g. to the reservoir. The reservoir may for example be arranged in the fixing device, e.g. in the frame and/or the eye glass hanger members.

Thus, with the amount of liquid in the cavity, a curvature of the flexible membrane may be varied, and thus the optical power lens 102 may be adapted e.g. according to the first and second mode, depending on the focusing distance and/or the correction offset.

In a further embodiment, apparatus 100 may be of an eye-glass type including a further flexible lens, wherein fixing device 106 may be adapted to fix lens 102 in front of a first eye of the user and the further lens in front of a second eye of the user.

For example, fixing device 106 may include two frames being adapted to hold and fix lens 102 and the further lens, respectively, in front of the eyes of the user, the frames being joint by a nosepiece and provided with hangers for hanging the fixing device e.g. upon the conchae of the ears of the user. Actuator device 104 and sensor device 108 may be arranged within the frame, the nose piece and/or the hangers.

Figure 2:
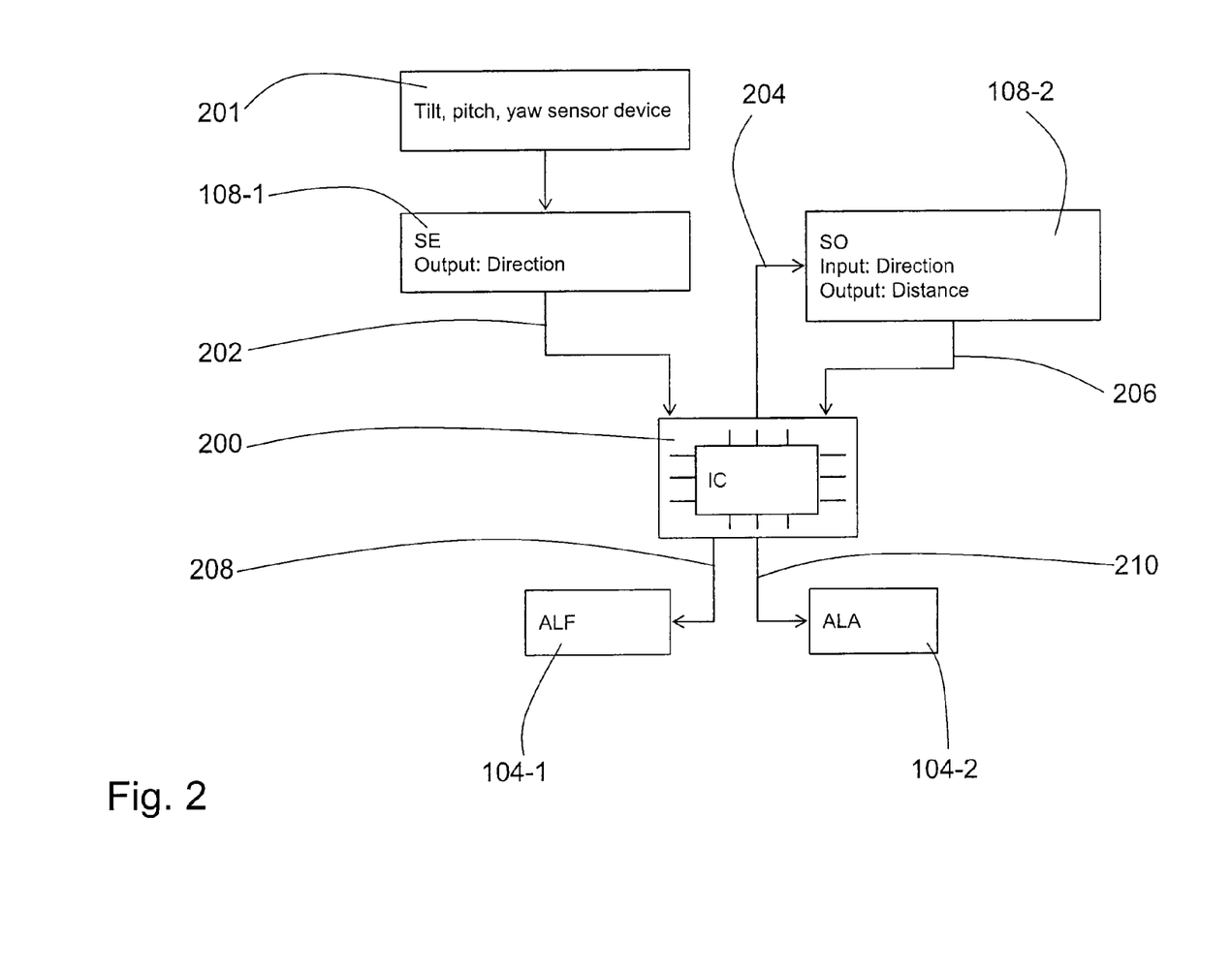
FIG. 2 illustrates a block diagram of the apparatus illustrated in FIG. 1.

FIG. 2 illustrates a block diagram of an embodiment of apparatus 100. Apparatus 100 is shown to include a processor 200 which may be adapted to control the operation of e.g. actuator device 104 depending on the focusing distance determined by sensor device 108.

In the embodiment, sensor device 108 is shown to include a first sensor 108-1 and a second sensor 108-2. First sensor 108-1 may be adapted to determine, e.g. at regular intervals or upon a change of orientation of apparatus 100 within space determined e.g. by a tilt, pitch and/or yaw sensing device 201, the viewing direction, e.g. the viewing direction of apparatus 100 and/or of the user, as discussed in the above. The viewing direction may be provided as an outcome to processor 200, as illustrated by arrow 202. Processor 200 may provide the viewing direction as an input to second sensor 108-2, as illustrated by arrow 204. Depending on the viewing direction, second sensor 108-2 may determine the focusing distance, as discussed in the above. The focusing distance may be provided as an outcome to processor 200, as illustrated by arrow 206.

Actuator device 104 is shown to include a first actuator 104-1 and a second actuator 104-2. First actuator 104-1 may be adapted to deform lens 102 in accordance with requirements depending on the focusing distance. For this purpose, the focusing distance may be provided as an input to first actuator 104-1, as illustrated by arrow 208. Second actuator 104-2 may be adapted to deform the lens in accordance with the predetermined correction offset, e.g. for correcting the visual impairment of the user. For example, second actuator 104-2 may be adapted to deform the lens for correcting an astigmatism of the user. For this purpose, the predetermined correction offset and/or an astigmatism correction value may be provided as an input to second actuator 104-2, as illustrated by arrow 210.

In a further embodiment, the first and/or second actuators may both be provided with both, the focusing distance and the correction offset. Further alternatively, if there are a plurality of actuators for each lens, each of these actuators may receive corresponding inputs.

For example, visual support corresponding to varifocals may be achieved by setting, for a first, nearer focusing distance, a first correction offset compensating hyperopia, and for a second, farther focusing distance a second correction offset compensating myopia.

Figure 3A:
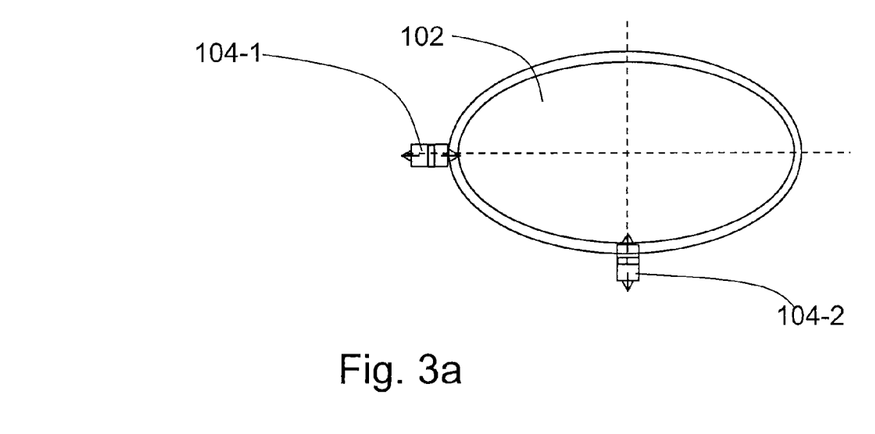
FIG. 3a illustrates a front view of an embodiment of an apparatus for eye sight enhancement with astigmatism correction.
Figure 3B:
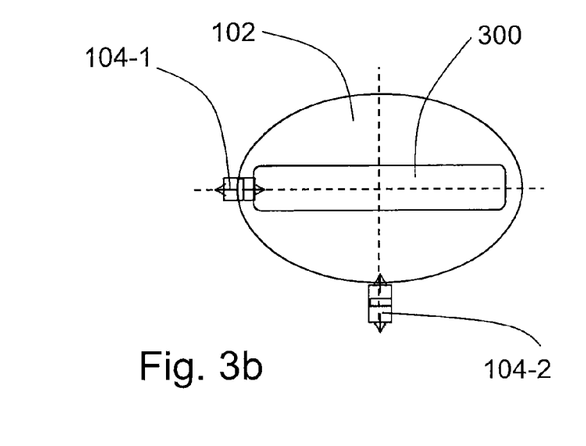
FIG. 3b illustrates a front view of a further embodiment of an apparatus for eye sight enhancement with astigmatism correction.
Figure 3C:
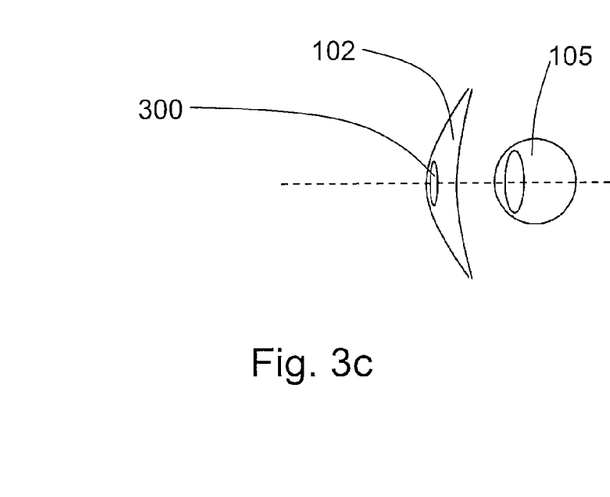
FIG. 3c illustrates a sectional side view of the embodiment of FIG. 3b.

FIGS. 3a to 3c illustrate embodiments of apparatus 100 particularly adapted to correct an astigmatism of the user. Astigmatism causes a user to suffer from a refractive error stemming from a difference in degree of curvature with respect to two different meridians of e.g. eye 105. Thus, eye 105 has different focal points in different planes. This refractive error may be corrected by flexible lens 102 when exhibiting different radii of curvature in different planes, correcting the difference in degree of curvature with respect to two different meridians of eye 105.

As illustrated in FIG. 3a, these different radii of curvature may be achieved by selectively controlling operation of the first and second actuator 104-1, 104-2. First actuator 104-1 may be arranged so as to apply a lateral force in a lateral direction to lens 102 when lens 102 is fixed in a mounting position. Second actuator 104-2 may be arranged so as to apply a vertical force in an essentially vertical direction to the lens, e.g. when the lens is fixed in the mounting position. Thus, by selectively controlling operation of the first and second actuators 104-1, 104-2, flexible lens 102 may be deformed such that it exhibits different radii of curvature in different planes, depending on the position of first and second actuator 104-1, 104-2 and on the direction of the forces applied by first and second actuators 104-1, 104-2 to flexible lens 102.

In a further embodiment, first actuator 104-1 may be adapted to apply the lateral force depending on the focusing distance, and second actuator 104-2 may be adapted to apply the vertical force depending on the predetermined astigmatism correction value, which corresponds in this embodiment to the correction offset. In particular, actuator 104-1 may be adapted to apply the lateral force depending only on the focusing distance, and second actuator 104-2 may be adapted to apply the vertical force depending only on the predetermined astigmatism correction value.

Accordingly, together with the dynamical adjustment of the optical power of flexible lens 102 depending on the focusing distance, an effective correction of astigmatism according to the predetermined astigmatism correction value may be achieved.

In the embodiment illustrated in FIG. 3b in a front view and in FIG. 3c in a sectional side view, an astigmatism correction cavity 300 may be arranged within flexible lens 102 such that it extends in an essentially horizontal direction when lens 102 is fixed in the mounting position. For example, cavity 300 may have larger extension in the horizontal direction than in the vertical direction. Cavity 300 may thus form an elongated channel extending through flexible lens 102 in the horizontal direction.

In the embodiment, actuator device 104 may include first actuator 104-1 adapted to apply a force to lens 102 depending on the focusing distance. Second actuator 104-2 may include a pump adapted to fill cavity 300 with the liquid depending on the predetermined astigmatism correction value. For example, first actuator 104-1 may be adapted to apply the force to lens 102 depending only on the distance. Further, second actuator 104-2 may be adapted to fill cavity 300 depending only on the predetermined astigmatism correction value.

This allows to selectively operate the first and second actuators 104-1, 104-2 and thus to achieve an exact regulation of the curvature of the at least one surface 102a, 102b of flexible lens 102. Thus the optical power and optical features of flexible lens 102 may be adapted with high precision in accordance with on the one hand the dynamic focusing requirements and on the other hand the visual abilities and visual impairments of the user. Thus, the user's eye sight may be precisely adapted and supported.

Figure 4:
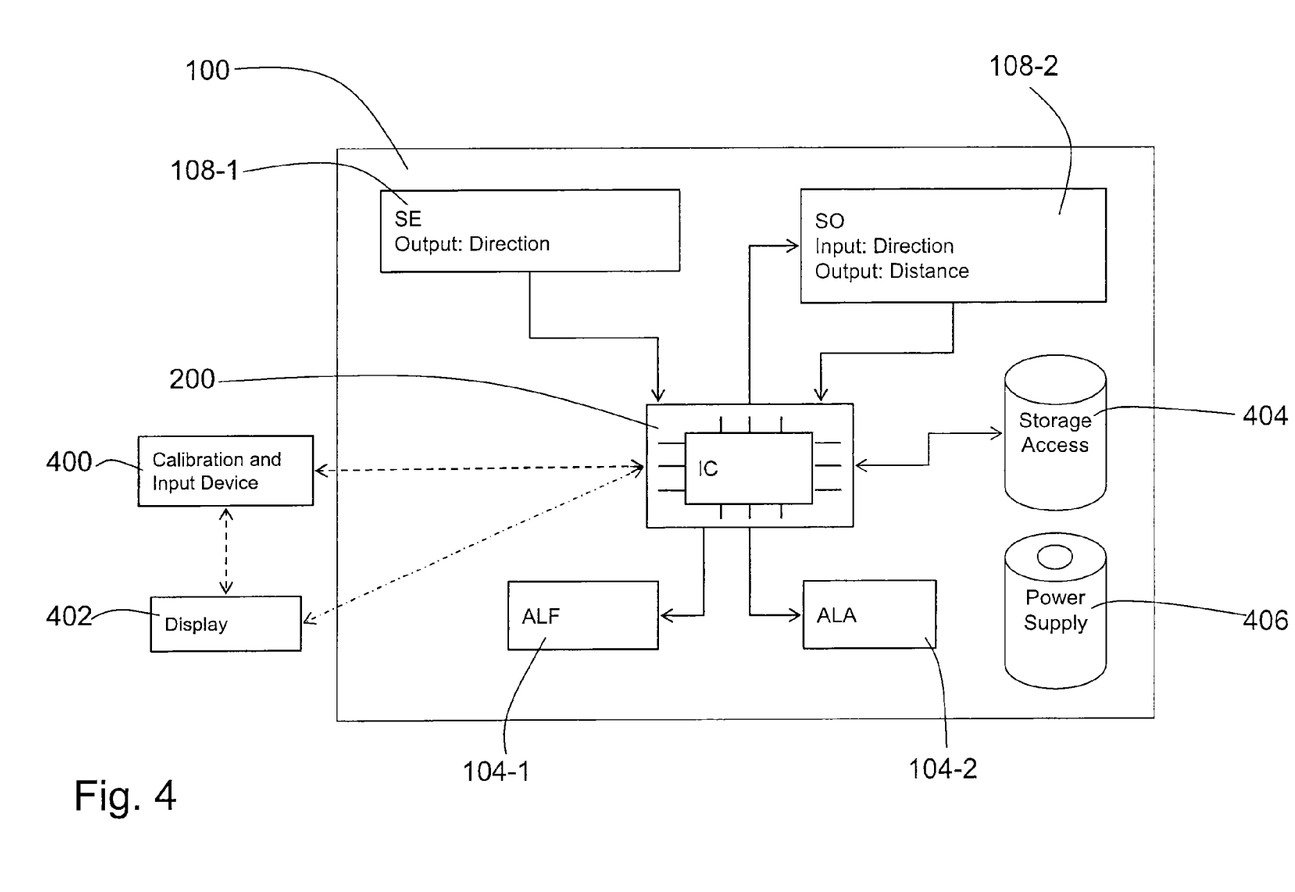
FIG. 4 illustrates a block diagram of a further embodiment of an apparatus for eye sight enhancement including a calibration facility.

FIG. 4 illustrates a block diagram of a further embodiment of apparatus 100 including a calibration facility. As illustrated, apparatus 100 may include an input device, e.g. calibration and input device 400, which input device may be adapted to input information and to provide information to processor 200. Processor 200 may be adapted to determine the correction offset and/or the astigmatism correction value depending on the information.

For example, as user input, the user may input refraction indices determined by optician. Based on these indices, the correction offset or the astigmatism correction value may be determined by processor 200.

Further, calibration and input device 400 may be adapted to input feedback data with respect to a calibration process. For example, calibration and input device 400 may include an input facility, such as a first button, for requesting a variation of lens shape, e.g. of the curvature of the at least one surface of flexible lens 102. The button or another input facility, e.g. a second button, may be provided for inputting user feedback with respect to the variation, e.g. a pressing of the button or further button when lens shape is found to be suitable by the user.

In a further calibration process, the user may face an object e.g. of a predetermined magnitude. The focusing distance may be measured by the second sensor, e.g. as two meters from the user. The lens shape may be varied upon the request, and a suitable lens shape may be determined from the user feedback. Depending on the suitable lens shape, processor 200 may be adapted to determine the correction offset and/or the astigmatism correction value.

In a further embodiment, apparatus 100 may include a communication interface adapted to communicate with a display 402. Processor 200 may be adapted to determine the correction offset and/or the astigmatism correction value depending on the information and/or depending on image data communicated to display 402.

For example, image data of a calibration program may be transmitted via the communication interface to display 402 and may be displayed to the user. The user may e.g. be prompted to face the display with a distance of two meters, to issue a starting command via the input device for requesting the variation of lens shape when placed in the correct position, and to provide feedback to the variation of lens shape via calibration and input device 400 during the calibration process.

During the calibration process, images may be displayed to the user. During the display of each image, the curvature of flexible lens 102 may be varied. The user may be instructed to provide feedback via calibration and input device 400, the feedback allowing determining a suitable curvature of flexible lens 102. Upon this basis, processor 200 may be adapted to determine the correction offset and/or the astigmatism correction value.

The images may include characters and/or numbers of different magnitude and different orientation, Snellen charts and/or an astigmatism sun wheel with rays having an angular distance of e.g. about ten degrees.

Communication between apparatus 100, calibration and input device 400 and/or display 402 may be performed through any network and according to any suitable communication protocol. For example, wireless communication e.g. via infrared, Bluetooth and/or Wi-Fi may be used. Alternatively, also wired communication lines may be used during the calibration process.

As further illustrated in FIG. 4, apparatus 100 may include a power supply 404, e.g. a battery and/or a rechargeable accumulator. The accumulator may be recharged e.g. in a charging station when apparatus 100 is not worn, e.g. at night when the user is sleeping.

Further, apparatus 100 may include a device 406 providing storage access, e.g. an integrated or built-in digital storage and/or an access interface to a separate, connectable storage device e.g. adapted for reading storage media. A storage medium, e.g. a non-transitory computer-readable medium, may include a computer program causing processor 200 to execute a method for calibrating apparatus 100, e.g. any of the embodiments of the method as discussed herein.

Figure 5:
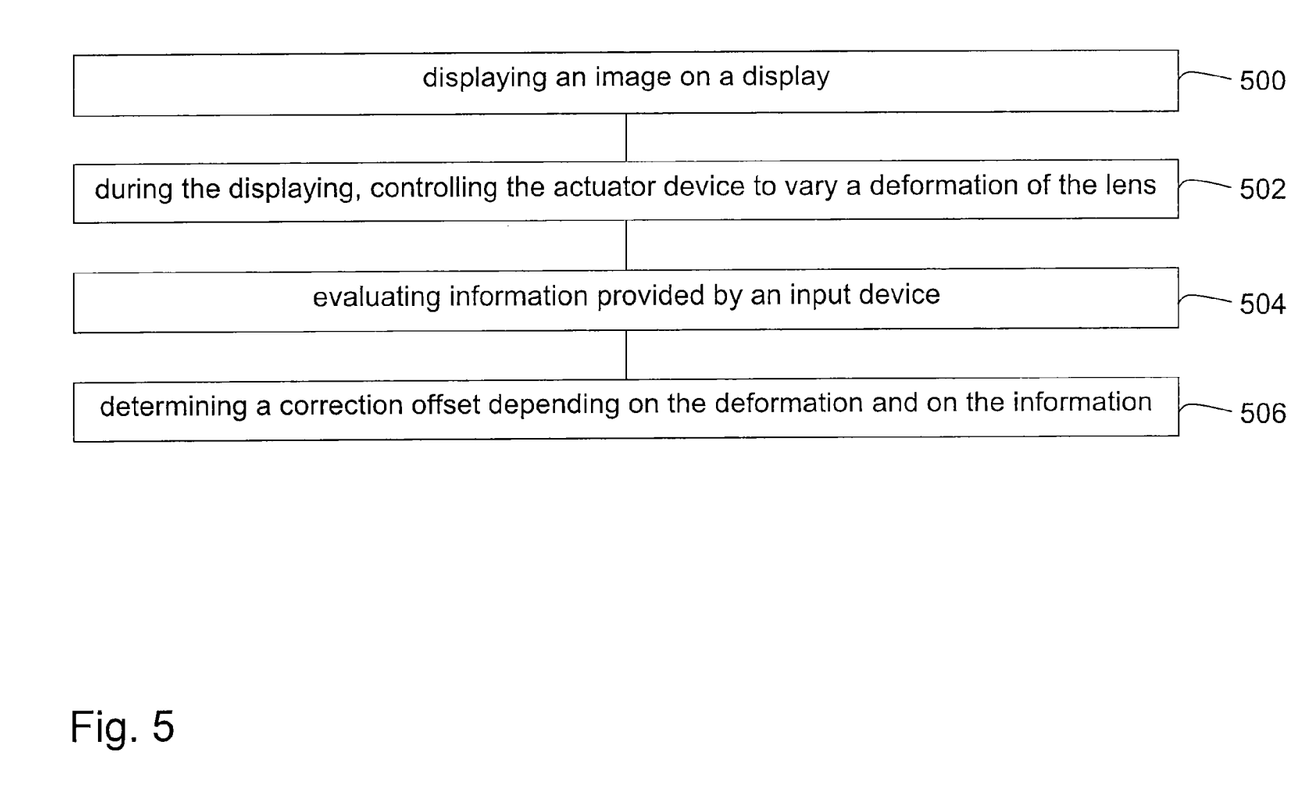
FIG. 5 illustrates an embodiment of a method for calibrating an apparatus for eye sight enhancement.

FIG. 5 illustrates an embodiment for calibrating an apparatus for eyesight enhancement, e.g. apparatus 100 corresponding to any of the embodiments discussed in the above.

At 500, an image is displayed on a display, e.g. display 402. The image may include characters and numbers of a varying magnitude and orientation or other charts as used by opticians for checking visual abilities of a user.

At 502, it is illustrated that during the displaying, an actuator device is controlled to vary a deformation of a lens. For example, actuator device 104 may vary the deformation of flexible lens 102.

At 504, it is illustrated that information (e.g. feedback information by a user) provided by an input device, e.g. calibration and input device 400, is evaluated.

At 506, a correction offset is determined depending on the deformation and on the information. For example, the predetermined correction offset and/or the astigmatism correction value may be determined, as discussed in the above.

Figure 6:
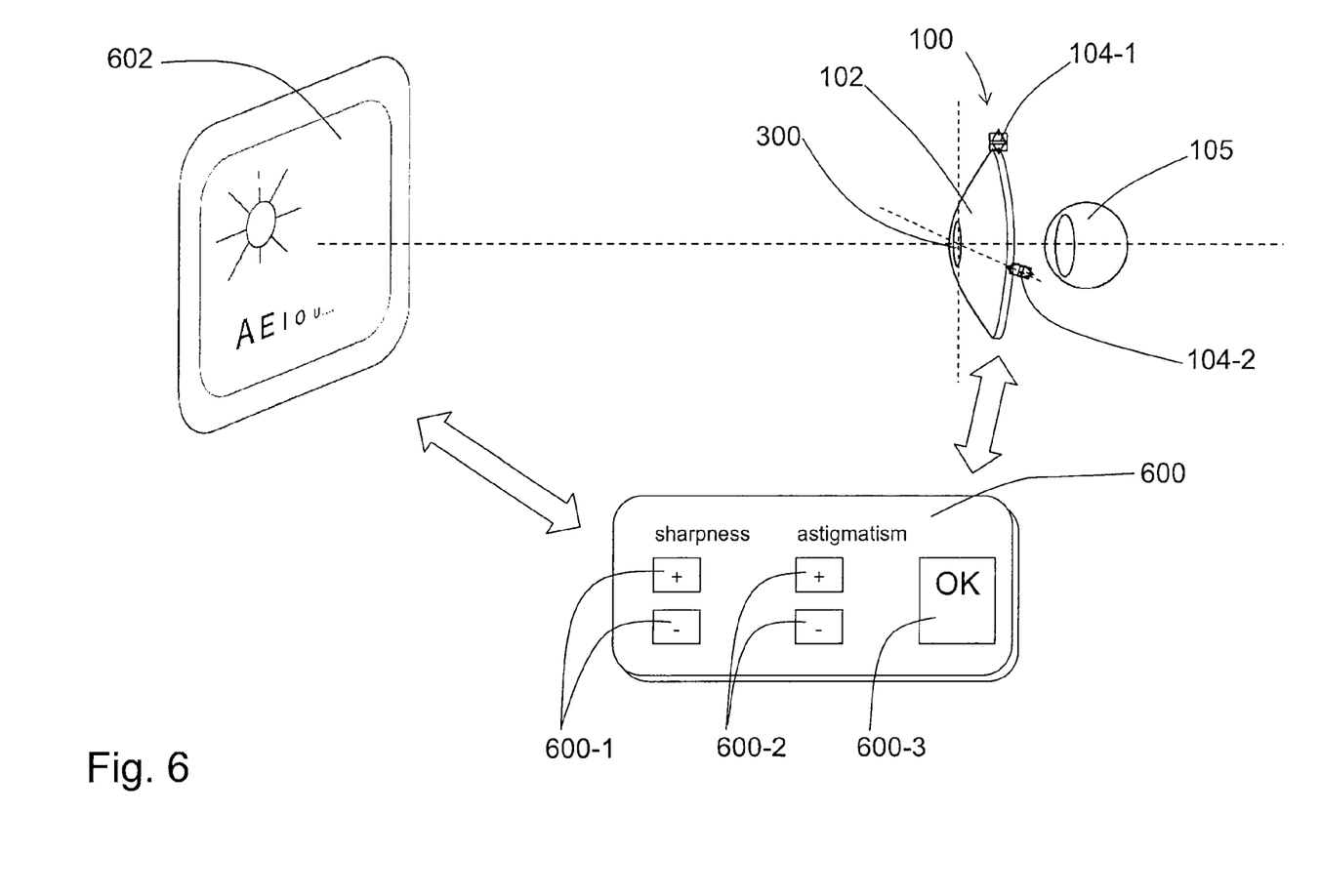
FIG. 6 illustrates calibrating an embodiment of an apparatus for eye sight enhancement.

FIG. 6 illustrates a further embodiment of apparatus 100 placed in front of the user's eye 105. As illustrated, the user performs a calibration process of apparatus 100 using a further calibration and input device 600, acting e.g. as a remote control for apparatus 100.

During the calibration process, the user may face display 402 with a pre-specified distance, while characters of varying magnitude and an astigmatism sun wheel are displayed. The user may then use further calibration and input device 600 for directly influencing and operating first actuator 104-1 and second actuator 104-2 e.g. via wireless or infrared communication with apparatus 100. For example by using operation using keys 600-1, the user may influence the first force applied by actuator 104-1 to flexible lens 102. Further, by using operation keys 600-2, the user may directly influence the quantity of liquid filled in cavity 300 by the second actuator 104-2.

During the calibration process, different images may be displayed at a display 602, e.g. depending on a request of the user. For each image, a sharpness and astigmatism variation may be performed using operation keys 600-1 and 600-2. When the deformation of flexible lens 102 is found to be suitable by the user, the user may press an OK button 600-3. Then, the correction offset and the astigmatism correction value may be determined accordingly by processor 200.

Obviously, numerous modifications and variations of the present disclosure are possible in light of the above teachings. It is therefore to be understood that within the scope of the appended claims, the invention may be practiced otherwise than as specifically described herein.

CROSS-REFERENCE TO RELATED APPLICATIONS

The present application claims priority of EP patent application No. 13 000 675.2 filed on 8 Feb. 2013, the entire contents of which are incorporated herein by reference.

The invention claimed is:

1. An apparatus for eye sight enhancement, comprising:
a lens having a first mode with a first optical power, and a second mode with a second optical power;
an actuator device configured to:
vary a mode of the lens from the first mode to the second mode and from the second mode to the first mode, and apply a lateral force and a vertical force in the lens;
a fixing device configured to fix the lens in a mounting position;
a sensor device configured to determine a focusing distance; and
a processor configured to control an operation of the actuator device depending on the focusing distance.

2. The apparatus according to claim 1, wherein
the lens is a flexible lens having a first surface and a second surface opposite to the first surface, wherein at least one of the surfaces is configured to be shaped in the first mode with a first curvature, and in the second mode with a second curvature; and
the actuator device is configured to deform the lens from the first mode to the second mode and from the second mode to the first mode.

3. The apparatus according to claim 1, wherein
the focusing distance corresponds to a distance of an object with respect to the apparatus.

4. The apparatus according to claim 1, wherein
the sensor device includes a first sensor and a second sensor, the first sensor being configured to determine a viewing direction, and the second sensor being configured to determine the focusing distance depending on the viewing direction.

5. The apparatus according to claim 1, wherein
the processor is configured to control an operation of the actuator device depending on a predetermined correction offset, the correction offset being utilized to correct a visual impairment.

6. The apparatus according to claim 1, wherein
the lens includes a transparent, elastic material and/or a polysiloxane.

7. The apparatus according to claim 1, wherein
in the first mode, the actuator device is configured to apply a first force to the elastic material, and in the second mode, the actuator device is configured to apply a second force to the elastic material, the first force and the second force being applied from an outer circumference of the lens towards a physical center of the lens.

8. The apparatus according to claim 1, wherein
the lens includes a cavity covered on a side facing the first surface by a first cover and on a side facing the second surface by a second cover, at least one of the first cover and the second cover including a flexible membrane, the cavity being filled with a liquid having a substantially similar refraction index as a material of the first cover, of the second cover and/or of the lens, and
in the first mode, the actuator device is configured to fill the cavity with a first quantity of liquid, and in the second mode, the actuator device is configured to fill the cavity with a second quantity of liquid.

9. The apparatus according to claim 8, wherein
the cavity is arranged such that it extends in a substantially horizontal direction when the lens is fixed in the mounting position; and
the actuator device includes a first actuator is configured to apply the lateral force to the lens depending on the focusing distance, and a second actuator is configured to fill the cavity depending on a predetermined astigmatism correction value.

10. The apparatus according to claim 1, wherein
the actuator device includes a first actuator and a second actuator, the first actuator being arranged so as to apply the lateral force in a lateral direction to the lens when the lens is fixed in the mounting position, and the second actuator being arranged so as to apply the vertical force in a substantially vertical direction to the lens when the lens is fixed in the mounting position; and
the first actuator is configured to apply the lateral force depending on the focusing distance, and the second actuator is configured to apply the vertical force depending on a predetermined astigmatism correction value.

11. The apparatus according to claim 1, further comprising:
an input device configured to input information and to provide the information to the processor, wherein
the processor is configured to determine a correction offset and/or an astigmatism correction value depending on the information.

12. The apparatus according to claim 1, further comprising:
a communication interface configured to communicate with a display, wherein
the processor is configured to determine a correction offset and/or an astigmatism correction value depending on information and/or depending on image data communicated to the display.

13. The apparatus according to claim 1, further comprising:
a rechargeable accumulator.

14. The apparatus according to claim 1, wherein
the apparatus is of an eye-glass type including another flexible lens; and
the fixing device is configured to fix the lens in front of a first eye of a user and the other lens in front of a second eye of the user.

15. A method for calibrating an apparatus for eye sight enhancement, the apparatus including a lens having a first mode with a first optical power, and a second mode with a second optical power, an actuator device configured to vary the mode of the lens from the first mode to the second mode and from the second mode to the first mode, a fixing device configured to fix the lens in a mounting position, a sensor device configured to determine a focusing distance, a processor configured to control an operation of the actuator device depending on the focusing distance, and an input device configured to input information and to provide the information to the processor, the method comprising:
displaying an image on a display;
during the displaying, controlling the actuator device to vary an optical power of the lens;
evaluating information provided by the input device;
determining a correction offset depending on a deformation and on the information;
controlling an operation of the actuator device depending on the correction offset; and
applying a lateral force and a vertical force in the lens.

16. A computer program recorded on a non-transitory computer readable storage medium containing computer readable instructions for causing a computer to execute the method of claim 15.

17. An apparatus for eye sight enhancement, comprising:
a lens having a first mode with a first optical power, and a second mode with a second optical power;
an actuator device configured to vary a mode of the lens from the first mode to the second mode and from the second mode to the first mode;
a fixing device configured to fix the lens in a mounting position;
a sensor device configured to determine a focusing distance; and
a processor configured to control an operation of the actuator device depending on the focusing distance,
wherein the lens includes a cavity that extends in a substantially horizontal direction when the lens is fixed in the mounting position.

* * * * *